Sept. 22, 1964 H. E. GATZKE 3,149,588
ART OF SEED-PLANTING
Original Filed July 31, 1962
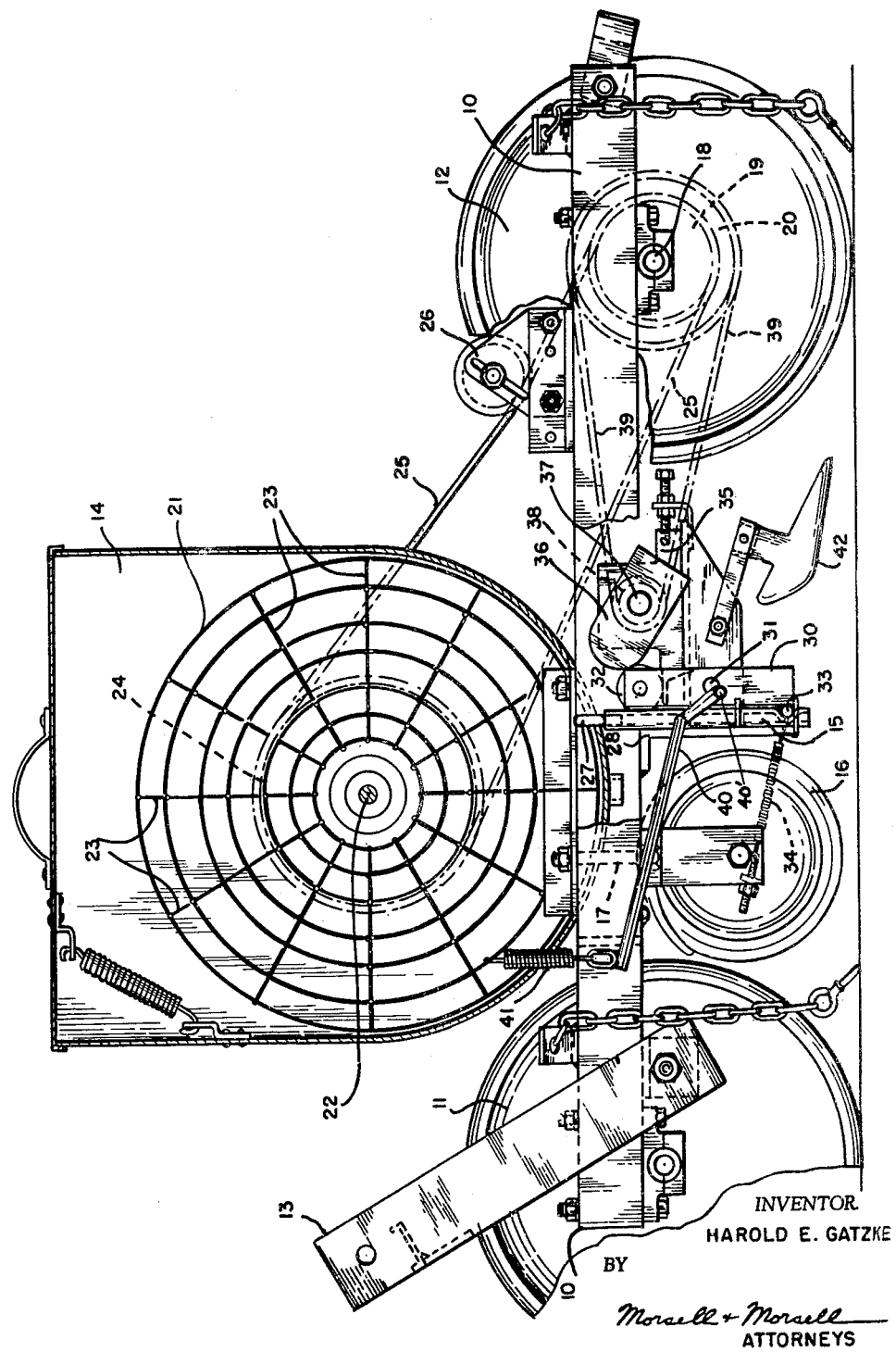
INVENTOR
HAROLD E. GATZKE
BY
Morsell & Morsell
ATTORNEYS

United States Patent Office 3,149,588
Patented Sept. 22, 1964

3,149,588
ART OF SEED-PLANTING
Harold E. Gatzke, Rte. 1, Box 71, Berlin, Wis.
Original application July 31, 1962, Ser. No. 213,690.
Divided and this application July 11, 1963, Ser. No. 294,445
2 Claims. (Cl. 111—1)

This invention relates to improvements in the art of seed planting and more particularly to a novel method of planting water-saturated seeds, the present application being a division of my application Serial No. 213,690 filed July 31, 1962.

It has long been recognized that the planting of vegetable and other seeds in a sprouted state is highly desirable, the term sprouted as used herein meaning a seed which has been saturated with water to start its germination process before it is planted in the ground. Such seeds not only require a shorter growth period in the ground, but they are better able to survive adverse soil and weather conditions, and the proportion of grown plants is substantially greater than that obtained with ordinary dry seeds. Unfortunately, however, such water-saturated seeds are necessarily in a soft, tender condition and it has heretofore been impossible to plant the same without bruising and damaging said tender seeds to the extent that they will not grow.

With the above in mind, the principal object of the present invention is to provide a method of planting sprouted seeds without destroying or damaging the same.

A more specific object of the present invention is to provide a novel method of planting sprouted seeds wherein said seeds are maintained in a suspended state in a portable container of water or other liquid, and deposited by gravity into the ground.

A further object of the invention is to provide a novel planting method wherein the seeds may be planted in predetermined, spaced relationship in the ground, thus substantially reducing the volume of seed required per acre, as compared to the conventional planting methods, and also promoting uniform plant growth and facilitating the task of culling the resulting crop.

With the above and other objects in view, which other objects and advantages of the present method will become apparent hereinafter, the invention consists of the novel method of seed planting set forth in the following specification and claims, and all equivalents thereof.

In the accompanying drawing there is shown an apparatus for performing the novel seed planting method comprising the present invention.

Referring now more particularly to the drawing, it will be seen that the general assembly of the illustrated seed-planting machine includes a pair of parallel horizontal frame members 10, which are preferably formed of hollow steel to combine strength with lightness in weight, and carried by and between said bars is a forward, ground-engaging wheel 11 and an aligned rear ground wheel 12. Said frame includes suitable hitch means 13 on its forward end for securing the same to the rear of a tractor or other pulling vehicle. Mounted on and above an intermediate portion of said frame is an enlarged container or tank 14, in which the seed-entraining fluid employed in the invention is carried, said tank having a discharge tube 15 depending therefrom, and mounted beneath said tank is a wheel 16 which is adapted to form a furrow in the ground traversed by the machine.

In accordance with the present invention, water or other liquid is placed in the container tank 14 and it may have seeds already carried therein, or a measured amount of dry seeds may be deposited in the water after the tank has been filled.

In the general operation of the illustrated machine, the wheel 16 forms a continuous furrow in the earth, as described, and small quantities of the seed-containing liquid from said tank 14 are intermittently deposited in said furrow, the machine then filling said furrow with a cover of dirt. As mentioned, in accordance with the present invention the seeds to be planted may be allowed to germinate as long as desired, and in planting lettuce and certain other vegetables, it has been found that seeds which have been allowed to germinate in water for approximately sixteen hours, and then exposed to air, provide excellent results. Herbicides or fungicides or the like can also be incorporated in the seed-containing liquid if desired.

With more particular reference now to the forward wheel 11 of the illustrated machine for performing the present invention, said wheel preferably includes a rubber tire having a concave peripheral surface, there being about a one-half inch concavity. The purpose of said concave wheel contour is to eliminate packing of the soil immediately in front of the furrow-forming wheel 16 when the machine is in progress, thereby facilitating the job of said furrowing wheel. In addition, due to such contour the tire is substantially deformed while engaged against the ground, and as each succeeding wheel portion rotates out of engagement with the ground it resumes its original form with a force sufficient to eject dirt adhering thereto.

The furrow-forming wheel 16 has a convex peripheral surface and is mounted immediately behind said forward wheel 11, the central peripheral portion of said convex furrowing wheel depending slightly below the innermost peripheral portion of said concave wheel relative to the ground, so that said furrowing wheel will be in engagement with the ground when the machine is in transit. Said furrow-forming wheel is suspended from the frame by a bolt 17 or similar device which may be turned to raise and lower said wheel to obtain the exact desired furrow depth. Due to the convex nature of said furrowing wheel, the earth forming the furrow is tightly compacted thereby. This is advantageous for the reason that compacted dirt promotes the capillary action of water in the ground, and ensures the seeds receiving a sufficient supply of water during growth.

The rear ground wheel 12 in the present machine is mounted behind and in alignment with said front wheel 11 and furrow-forming wheel 16, and is provided with an axle 18 having a sheave 19 and a sprocket 20 thereon, the function of which will be seen. Like the front wheel 11, the periphery of said rear wheel is preferably concave in form to provide automatic purging of dirt therefrom. Moreover, after the seeds have been deposited in the furrow, as will be described, the present machine provides means for filling said furrow with dirt, and the concave contour of said rear wheel prevents said wheel from compacting the dirt fill too tightly as it passes thereover. While it is advantageous to have the earth on the underside of the furrow compacted, to provide maximum capillary action, it is desirable that the dirt cover on top of said seeds be relatively loose to permit the young seeds to obtain oxygen from the air.

With reference now to the supply tank 14 for the seed-containing liquid, said tank is generally rectangular in form but is provided with a semicircular lower portion, and a removable top cover. It has been found that a fourteen-gallon capacity tank is satisfactory for most purposes, but the size of said tank can be varied as desired, of course, and the invention is not to be limited in this respect. Similarly, while the illustrated machine is intended for the planting of lettuce seeds, and the gear ratios, etc. are specifically designed for this purpose, it is to be understood that the machine is adaptable for planting any kind of crop, and the invention is intended to include not only the illustrated machine, but also any apparatus adapted to perform the novel planting method comprising the invention.

Rotatably mounted within said tank 14 is an agitator 21 having a plurality of radial, laterally-extending arms or paddles 23 formed of relatively large mesh wire screening (approximately 1") said agitator being mounted on a rotatable shaft 22 journaled in the side walls of said container, and there being suitable liquid-tight seals therefor. In accordance with the method comprising the present invention, predetermined quantities of seeds and water are introduced into the tank 14, as hereinabove described, the ratio of seeds to water depending upon the particular planting operation, and it is essential that said seeds are maintained in a suspended state therein. Moreover, it is critical that the agitator does not bruise or injure such water-saturated seeds. In this respect, it has been found that the wire screening forming the agitator paddles performs excellently in thoroughly dispersing said seeds throughout the liquid without damaging said tender seeds.

Mounted on one end of said agitator shaft 22 externally of the tank wall is a sheave 24 and trained thereabout, and about the aforementioned sheave 19 on the rear wheel axle, is a V-belt 25, thus rotatably drivably connecting said agitator to the rear ground wheel 12. An adjustable bracket and idler assembly 26 on the frame is designed to bear against said V-belt and can be adjusted relative thereto to obtain the desired belt tension. In the illustrated machine, the ratio between said agitator and rear wheel sheaves is such that the agitator rotates at 22 r.p.m. when the machine is being towed at approximately 2 m.p.h. As mentioned, however, this ratio may be varied as required for particular planting requirements.

As appears in the drawing, a copper pipe 27 is mounted in and projects upwardly through the bottom wall of said tank 14 a short distance, said upward projection preventing sludge or the like which settles on the container bottom from entering said pipe, and there being cutouts in said agitator paddles to accommodate the same, and surrounding the exterior portion of said pipe 27 and depending substantially therebelow is the discharge tube 15. Said tube is preferably formed of surgical live gum rubber or similar extremely flexible rubber-like material, and is positioned against the flat, vertical face of a rigid bracket 28 depending from the frame.

Mounted to the rear and adjacent said flexible discharge tube 15 is an arm member 30 which is pivotally mounted on a transverse shaft 31 at its approximate longitudinal midpoint. The upper portion of said arm is provided with a roller 32 and the lower portion of said arm has a forward protrusion formed by a transverse pin 33 which is adapted to bear against the lower end of the flexible rubber tube 15 when said arm is in its normal, vertical position, said protrusion pinching said tube against the face of the rigid bracket 28 to seal the same and prevent flow of the seed-containing liquid from the tank. Connected to said arm 30 and to the fork of the furrowing wheel 16 is an expansion spring 34 which is adapted to yieldably maintain said arm in its tube-closing position.

Mounted on a bracket 35 behind said pivotal arm member 30 is an eccentric cam 36 which is rotatably carried on a transverse shaft 37, said cam-supporting bracket being longitudinally adjustable on the frame. Said cam is so positioned relative to said pivotal arm member 30 that the eccentric cam face is brought into engagement with the roller 32 on the upper end of said arm every time said cam is revolved 360°, thus intermittently rocking said arm about its axis (said arm having about a ⅜" travel) against the tension of the spring 34. The pin 33 is thereby swung away from its normal, tube-closing position, and a quantity of the seed-containing liquid is intermittently deposited in the furrow. Said cam shaft 37 has a sprocket 38 on one end thereof and trained thereabout, and about the aforementioned sprocket 20 on the rear ground wheel is a drive chain 39. Thus, when the machine is in transit, the rear wheel 12 not only drives the agitator 21, as hereinabove described, but said rear wheel is also geared to and actuates the seed discharge control mechanism.

In the illustrated form of machine, the eccentric cam 36 rotates approximately three times per second when the machine is being towed at about 2 m.p.h., resulting in the discharge tube being opened, and a small quantity of the seed-containing liquid deposited in the furrow, every fourteen inches or so.

As is shown, mounted adjacent the discharge tube 15 is an elongated lever 40 having lug means 40' thereon engageable with said flexible discharge tube intermediate its length. Said lever can be pivotally moved into and out of closing engagement with the tube, and includes a spring 41 or the like on its forward end leading to a handle (not shown), whereby the operator can close said tube to stop the planting operation at any time.

Mounted on the frame behind the discharge tube 15 is a furrow-closing mechanism preferably formed of a pair of plow-like shoes 42 which are mounted at an angle to direct dirt into the furrow after the seeds have been deposited therein. As mentioned, the concave rear wheel 12 also cooperates in the covering of said furrow and functions to smooth the same out without compacting the dirt.

From the foregoing, it will be seen that the present invention comprises a novel planting method wherein the seeds are saturated with water, are maintained in a state of suspension and evenly dispersed throughout a portable container, and are allowed to flow by gravity from said container into a furrow in the ground. It has been found that this novel planting method has several important advantages over the conventional system, wherein dry seeds are planted. With the present invention it is not only possible to plant a greatly increased acreage per pound of seed, but the plants may be accurately spaced relative to each other, in contrast to the usual method of planting wherein the seeds are deposited in the furrow more or less continuously, and wherein the result is that a majority of the young plants have to be manually pulled out in order to obtain sufficient spacing between plants for proper growth. The latter method is not only wasteful, but necessitates substantial labor costs. Moreover, such manual spacing is usually inaccurate and it is unlikely that all of the plants will have an equal area in which to grow, as is ensured with the accurate spacing provided by the present machine.

With the present invention, each shot or quantity of seed-containing liquid discharged into the furrow contains about three or four seeds, and as the young plants protrude from the ground it is relatively simple for the workmen to cull the same and it is natural for them to leave the largest, healthiest plant in each group. Thus, not only are fewer plants wasted, but the remaining plants are the largest, which is not usually true with the conventional thinning or culling method, and all of the plants in a field are of approximately uniform size. The latter feature greatly facilitates the job of the grader and packer, and effects additional substantial savings. A further advantage of uniform plant size is that the growth period is also uniform, thus permitting the harvesting of an entire field at one time, and which is particularly important with crops such as lettuce wherein even a twenty-four hour emergence difference can be critical.

It is to be understood, of course, that while accurate space planting is one of the important features attributable to the present invention, the novel planting method hereinabove described can also be used to advantage in continuous-row planting. For this purpose the intermittent discharge mechanism on the planting machine can be disconnected, and the discharge tube allowed to remain in an open condition while the machine traverses the field.

From the foregoing detailed description, it will be seen that the present invention provides a novel method of planting seeds which has numerous advantages over conventional seed-planting methods. As mentioned, it is to be clearly understood that the invention is intended to include not only the exact steps hereinabove described, but also any and all modifications or changes therein as may come within the spirit of said invention and within the scope of the following claims.

What I claim is:

1. In a continuous progressive method of automatically planting seeds which have begun to germinate, such seeds being soft, tender, and readily susceptible to damage, the steps of: depositing the seeds in a portable, confined body of liquid; continuously, non-violently agitating said liquid to maintain said seeds in a state of suspension in and substantially evenly dispersed throughout said liquid and in spaced relationship to each other; forming an elongated furrow in the earth while transporting the seed-containing body of liquid along said furrow; introducing said seed-containing liquid into said furrow by a quiescent gravity hydraulic flow; and thereafter covering said furrow with earth.

2. The method recited in claim 1 wherein said seeds are introduced into said furrow in spaced groups, the spacing between said groups being predetermined and dependent upon the speed of transportation of said seed-containing body of liquid.

References Cited in the file of this patent

UNITED STATES PATENTS

| | | |
|---|---|---|
| 952,607 | Coplen | Mar. 22, 1910 |
| 2,601,834 | Carter | July 1, 1952 |
| 2,682,428 | Roberts | June 29, 1954 |
| 2,878,617 | Finn | Mar. 24, 1959 |

FOREIGN PATENTS

| | | |
|---|---|---|
| 448,388 | Canada | May 11, 1948 |